United States Patent [19]
Gilette et al.

[11] 3,984,141
[45] Oct. 5, 1976

[54] LOADER FRAME STRUCTURE

[75] Inventors: Roy A. Gilette, Maurice Klee, both of Burlington, Iowa

[73] Assignee: J. I. Case Company, Racine, Wis.

[22] Filed: Dec. 6, 1974

[21] Appl. No.: 530,211

[52] U.S. Cl. ............................. 296/28 R; 280/5 F; 280/106 R
[51] Int. Cl.² ........................................ B62D 21/16
[58] Field of Search .................... 296/28 R, 28 F; 280/5 A, 5 F, 5 H, 106; 214/140; 114/140

[56] References Cited
UNITED STATES PATENTS

| | | | |
|---|---|---|---|
| 2,065,480 | 12/1936 | Soper | 114/140 X |
| 2,395,039 | 2/1946 | Crosby | 280/5 F |
| 2,923,268 | 2/1960 | Fletcher et al. | 280/5 A |
| 2,927,711 | 3/1960 | Naggiar | 280/5 F |
| 3,292,968 | 12/1966 | Halibrand et al. | 296/28 R |
| 3,850,473 | 11/1974 | Huber | 280/5 A |

FOREIGN PATENTS OR APPLICATIONS

| | | | |
|---|---|---|---|
| 993,973 | 11/1951 | France | 280/5 F |
| 762,366 | 4/1934 | France | 296/28 |

*Primary Examiner*—L. J. Paperner
*Assistant Examiner*—Winston H. Douglas
*Attorney, Agent, or Firm*—Dressler, Goldsmith, Clement, Gordon & Shore, Ltd.

[57] ABSTRACT

A material handling implement is disclosed in this application. The material handling implement includes a body that defines an engine space at one end and a forward space at the opposite end with a pair of stanchions projecting upwardly at the rear of the body. The body consists of a rigid plate that is bent at spaced locations to define the bottom wall and side walls for the engine and forward spaces as well as outwardly directed flanges at the upper ends of the respective side walls. The body is reinforced adjacent the forward and rear ends and the reinforcement at the rear end defines a fuel tank. The body is further reinforced intermediate the forward and rear ends by walls that define compartments for housing chains.

5 Claims, 3 Drawing Figures

U.S. Patent  Oct. 5, 1976  3,984,141
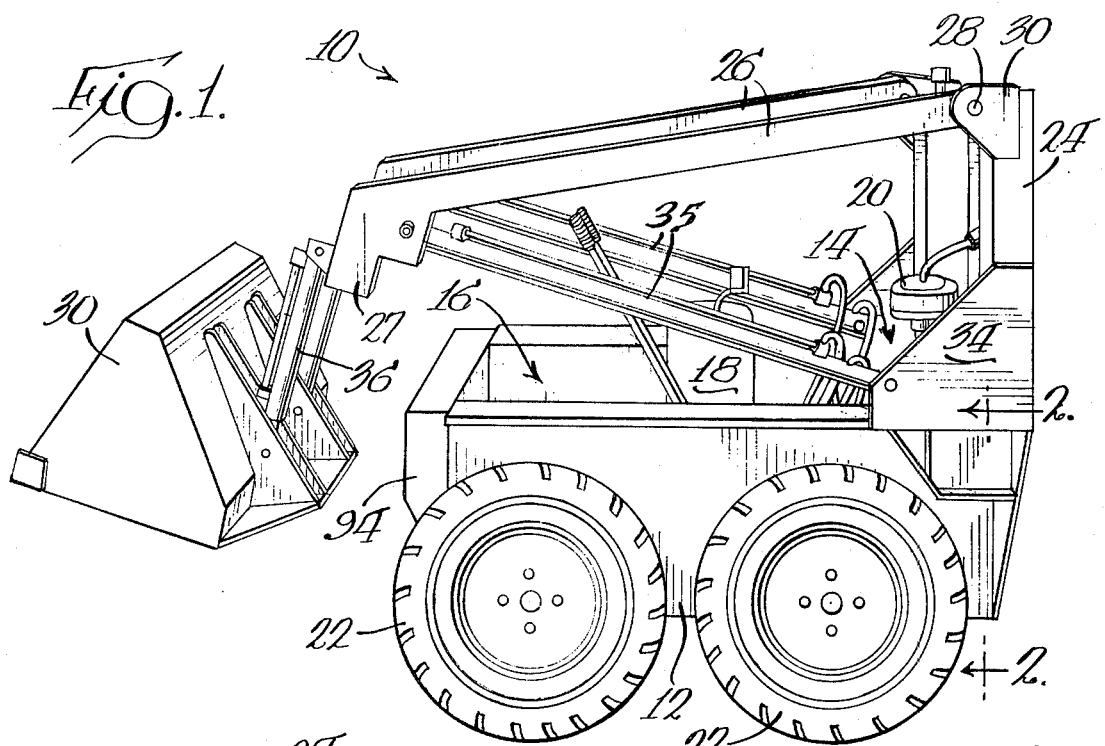
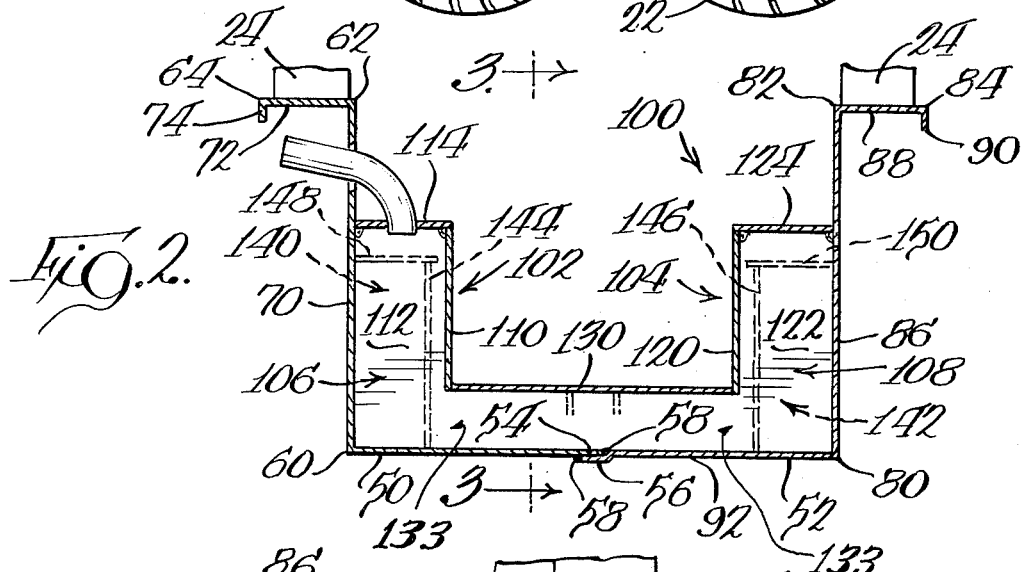
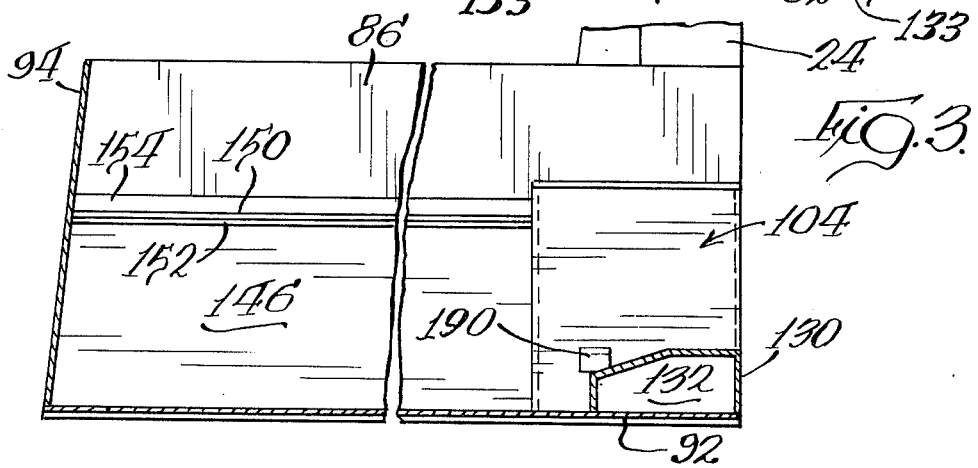

LOADER FRAME STRUCTURE

BACKGROUND OF THE INVENTION

The present invention relates to the art of vehicles of the tractor type and is particularly concerned with vehicles that accommodate various attachments for handling material, such as front end loaders, dozer blades, fork lifts, etc.

The use of self-propelled vehicles for handling material has been known for many years. In many instances, limited space requirements in areas such as warehouses, make it mandatory that the vehicle or unit be compact, highly maneuverable and light weight. Units of the general character of which this invention is related are shown in Melroe et al. U.S. Pat. No. 3,231,117, issued Jan. 25, 1966 and Olsen et al. U.S. Pat. No. 3,279,637, issued Oct. 18, 1966.

As will be appreciated, the size and weight for the various components that form the frame structure for a vehicle of this type considerably increase the overall weight and size of the unit. Thus, any reduction in the number and weight of the various frame components can appreciably reduce the overall size and weight of the unit.

SUMMARY OF THE INVENTION

The present invention contemplates a frame structure for a tractor vehicle that is to be used in handling material and in which the frame structure is formed of readily available metal pieces that can be interconnected by welding to produce a rigid frame.

The tractor vehicle includes a vehicle body having an engine space at the rear end and a forward space for the operator's legs at the forward end with a seat for the operator mounted on the body intermediate the engine space and forward space.

The body consists of a rigid plate that is bent at spaced locations between opposed edges to define a bottom wall and side walls for the engine and forward spaces with an outwardly directed flange at the upper end of each of the side walls. The body is reinforced in the engine space by members connected to the bottom and side walls of the plate. The members cooperate with the rigid plate to define a fuel tank in the engine space. The body is further reinforced intermediate opposite ends and this further reinforcement defines a pair of compartments that are utilized to house the drive chains for the vehicle.

The forward end of the vehicle body has a unitary piece which is secured to the bottom and side walls, as by welding, to rigidify the forward end of the body. In addition, gusset plates are secured to the one piece plate at various locations, particularly between the flanges and the side walls of the body to further rigidify the flange structure.

All of the components described above that form the frame structure for a material handling implement, such as a loader, can be formed of stock parts which need not be machined to close tolerance, thereby considerably reducing the cost of the frame structure. Furthermore, the arrangement and relationship of the various parts that form the frame structure reduces the number of parts making up the frame thereby considerably reducing the overall weight of the frame structure.

BRIEF DESCRIPTION OF SEVERAL VIEWS OF DRAWINGS

FIG. 1 is a perspective view of a vehicle having the present invention incorporated therein;

FIG. 2 is a transverse sectional view of the vehicle as viewed along line 2—2 of FIG. 1; and FIG. 3 is a fragmentary vertical section taken generally along lines 3—3 of FIG. 2.

DETAILED DESCRIPTION

While this invention is susceptible of embodiment of many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings shows a tractor vehicle, generally designated by the reference numeral 10. Tractor vehicle 10 consists of a frame structure including body 12 defining engine space 14 at the rear end thereof and forward space 16 for the operator's legs at the forward end thereof. Seat 18 is located intermediate the engine space and the forward space and extends above body 12. Engine 20 is located in engine space 14 at the rear end of body 12, while body 12 is supported on first and second pairs of ground engaging members or wheels 22 rotatably supported on body 12 by stub shafts. One pair of wheels is located on each side of body 12.

Tractor vehicle 10 further includes first and second stanchions 24 extending above body 12 adjacent the rear end thereof on opposite sides of engine space 14. A lift arm 26 is pivotally mounted by pivot pin 28 adjacent the upper end of each stanchion 24. Pin 28 may be supported on forwardly extending brackets 30 (only one being shown).

Lift arms 26 extend forwardly along opposite sides of spaces 14 and 16 as well as seat 18 and have front portions 27 directed downwardly adjacent the front end of body 12. Material handling member 30, illustrated as a bucket, is pivotally connected to the forward ends of lift arms 26 through pins (not shown). Materially handling 30 may take a variety of forms such as a dozer blade, scoop, fork lift, etc.

Lift arms 26 may be raised and lowered by fluid rams 35 each having one end pivotally connected to inner and outer gusset plates, only outer plate 34 being shown, rigidly secured to upright stanchion 24 and body 12. Likewise, material handling member may be pivoted on the forward ends of lift arms 26 through fluid rams 36.

According to the present invention, the entire frame structure or body for the vehicle is produced with readily available sheet metal that is interconnected in such a manner to result in an extremely rigid unit that is inexpensive to manufacture. More specifically, all of the pieces of the frame structure are preferably formed of conventional sheet metal that can readily be secured together by welding which considerably reduces the amount of machining that is normally required for producing such structures.

As shown in FIGS. 1 and 2, body or main supporting center bottom frame structure 12 includes first and second plate portions 50 and 52 that have overlapping adjacent edges 54 and 56 interconnected by weld 58 to produce a continuous rigid plate. First plate portion 50 is bent along first, second and third bend lines 60, 62, 64, all extending generally parallel to each other. The area between bend lines 60 and 62 extends substantially perpendicular to the portion of the plate adjacent edge 54 to result in a first vertical side wall 70 and the area between bend lines 62 and 64 forms an outwardly directed flange 72 having a downwardly directed lip 74 on the outer free edge thereof.

Likewise, plate portion 52 is bent along bend lines 80, 82 and 84 to produce a second vertical side wall 86, a horizontal outwardly directed flange 88 and a downwardly directed lip 90 on the opposite side of the vehicle. The lower generally horizontal sections of plates 50 and 52 define a bottom wall 92 for the body or frame structure.

Thus, the operator's compartment and engine space are defined by two plate portions that are welded together to produce a rigid plate.

The rigid plate is rigidified at the forward end by a front wall 94 welded to bottom wall 92 and side walls 70 and 86, while the rear end includes rigidifying means 100 that cooperate with the bottom wall and side walls to produce a fuel tank.

Rigidifying means 100 consists of first and second members 102 and 104 which are identical in construction and respectively cooperate with first side wall 70 and second side wall 86 as well as bottom wall 92 to define first and second compartments 106 and 108. First member 102 consists of a U-shaped portion that has a base 110 and a pair of legs 112 with the free ends of the legs being sealed to the side wall 70, preferably by welding. In addition, the base or central portion 110 and both legs 112 are sealed to plate portion 50 defining a portion of bottom wall 92. First member 102 also includes a top plate 114 that is secured to base 110 and legs 112 of the U-shaped member as well as to side wall 70 to produce a substantially rectangular sealed left-hand compartment 106 adjacent side wall 70.

Second member defining right-hand compartment 108 likwise consists of a substantially U-shaped portion having a base 120 and a pair of legs 122 with the free edges of the legs being sealed to second side wall 86 by welding while one edge of the U-shaped member is secured to bottom wall 92 by welding. Again a top plate 124 is welded to the remaining edge of the U-shaped portion to define the second sealed compartment 108.

The two sealed compartments 106 and 108 are interconnected by a third member 130 that cooperates with bottom wall 92 to interconnect first and second compartments 106 and 108. Third member 130 is substantially C-shaped in cross-section, as seen in FIG. 3, and has the outer free edges thereof welded to bottom wall 92 to produce an elongated opening 132 having opposite ends in communication with compartments 106 and 108 respectively through openings 133 in respective central portions 110 and 120. The opposite ends of third member 130 are also welded central portions to bases 110 and 120 of the U-shaped members forming part of compartments 106 and 108.

Thus, it will be seen that the rigidifying means 100 not only provides rigidity between side walls 70 and 86 and bottom wall 92 but also defines the fuel tank for supplying fuel to engine 20. In this respect, it will be noted that the fuel tank is located adjacent the rear end of body 12 and is generally U-shaped in elevation (FIG. 2) with engine 20 being located in close proximity thereto to simplify the connection. In fact, one or more mounting brackets 190 may be connected directly to C-shaped member 130 to provide a partial support for the engine, the remainder of which is not shown.

It should be noted that the C-shaped member 130 not only provides a chamber interconnecting the two compartments 106 and 108 but also performs a second important function adding to the structural rigidity of the vehicle in that it serves as a torque tube joining the two sides of the vehicle by being rigidly connected to members 102 and 104 which in turn are connected to side walls 70 and 86.

Body 12 also includes rigidifying means intermediate the forward and rear ends that define a pair of compartments for housing the drive chains that connect the respective wheels to the hydraulic drive motors. These compartments are illustrated in FIGS. 2 and 3 and are again formed by metal plates.

The rigidifying means that define chain compartments 140 and 142 include first and second vertically positioned plates 144 and 146 that respectively extend parallel to and are spaced from side walls 70 and 86. The respective plates span the entire distance between front wall 94 and the forward ends of compartments and are welded thereto as well as to bottom wall 92. Compartments 140 and 142 also have cover plates 148 and 150 which are preferably removable.

Cover plates 148 and 150 may be removably secured in any one of a number of ways, such as by having flanges 152 and 154 on the respective plates. Cover plates 148 and 150 would then extend across flanges 152 and be secured thereto by bolts while flanges 154 would be secured to the respective side walls 70 and 86 by bolts.

If further rigidity is desired between side walls 70 and 86 and plates 144 and 146, further bolts could be used to interconnect the associated side walls and plates with spacers surrounding these bolts.

Again, compartments 140 and 142 provide increased ridigity for body 12 and also perform a second function of housing the drive chains (not shown).

As can be appreciated from the above, the present invention provides an extremely inexpensive rigid unit that defines the frame structure or body for the vehicle as well as the fuel tank. The entire device can be built without the use of any tool other than welding equipment.

What is claimed is:

1. A main supporting center bottom frame structure for a tractor vehicle adapted to support a pair of lift arms with a material handling member attached to the lift arms comprising; a rigid plate bent at selected locations to produce a body having a bottom wall, transversely spaced upright first and second side walls and outwardly directed flanges at the upper ends of said side walls; and rigidifying means cooperating with said bottom wall and side walls of said body, said rigidifying means including first and second members, said first member including a U-shaped portion sealed to a portion of said first side wall and a portion of said bottom wall and a top plate sealed to said side wall and said U-shaped plate to define a first compartment, said second member including a U-shaped portion sealed to a portion of said second side wall and a portion of said bottom wall and a top plate sealed to said second wall and the associated U-shaped plate to define a second compartment, said U-shaped portions having openings in respective bases thereof, and a third member interconnecting said first and second compartments, said third member including a substantially C-shaped plate having opposite edges sealed to said bottom wall and opposite ends sealed to the central portion of the respective U-shaped members to define a chamber having opposite ends in communication with the respective compartments through said openings, said first, second and third members cooperating with said bottom wall and side walls to produce a generally U-shaped fuel tank for said vehicle.

2. A frame structure as defined in claim 1, in which said rigid plate includes first and second plate portions having overlapping interconnected adjacent edges located in said bottom wall and substantially equally spaced from said first and second side walls.

3. A frame structure as defined in claim 1, in which said rigidifying means further includes means defining a further pair of compartments respectively located adjacent the first and second side walls intermediate opposite ends of said body.

4. A frame structure as defined in claim 3, in which each of said pair of compartments includes a vertical plate spaced from an associated side wall and a cover plate.

5. A frame structure as defined in claim 4, in which said first and second compartments are located at one end of said body and said body includes a front wall at the opposite ends and in which said vertical plates and cover plates span the distance between said first and second compartments.

* * * * *

UNITED STATES PATENT AND TRADEMARK OFFICE
CERTIFICATE OF CORRECTION

PATENT NO. : 3,984,141
DATED : October 5, 1976
INVENTOR(S) : ROY A. GILLETTE and MAURICE KLEE It is certified that error appears in the above-identified patent and that said Letters Patent are hereby corrected as shown below:

The name of the first inventor "Roy A. Gilette" should read --Roy A. Gillette--.

Column 2, lines 43-44, "Materially handling" should read --Material handling--.

Column 3, line 57, after "welded" insert --to--.

Column 3, line 57, after "portions" change "to" to --of--.

Signed and Sealed this

Eleventh Day of January 1977

[SEAL]

Attest:

RUTH C. MASON
Attesting Officer

C. MARSHALL DANN
Commissioner of Patents and Trademarks